Figure 1:
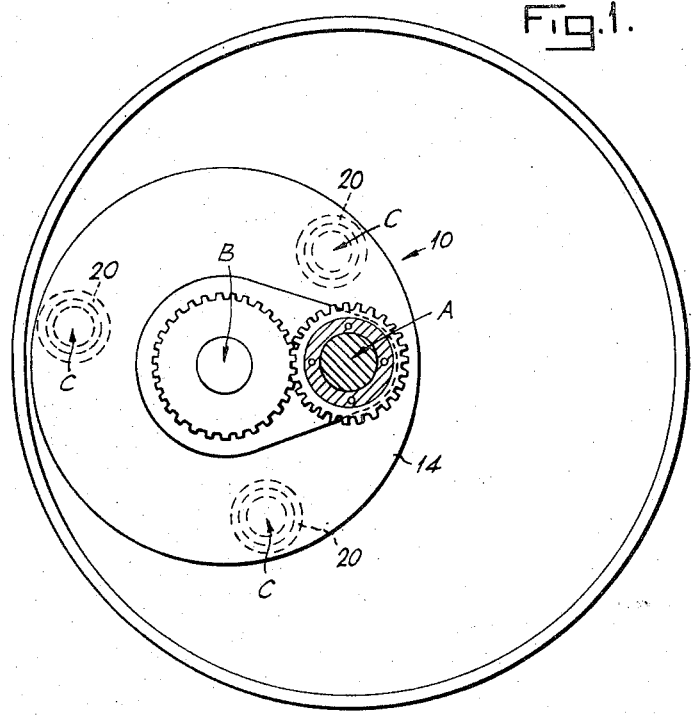

United States Patent [19]
Hoskins

[11] 3,785,621
[45] Jan. 15, 1974

[54] PREPARATION OF MIXES
[75] Inventor: Leonard Maxwell Hoskins, Hughenden Valley, England
[73] Assignee: National Research Development Corporation, London, England
[22] Filed: Sept. 28, 1970
[21] Appl. No.: 76,066

[30] Foreign Application Priority Data
Sept. 29, 1969 Great Britain............... 47,872/69

[52] U.S. Cl. ............................................. 259/102
[51] Int. Cl........................... B01f 7/26, B29h 1/10
[58] Field of Search...................... 259/99, 102, 103, 259/11–24, 48–53, 54–58

[56] References Cited
UNITED STATES PATENTS
| | | | |
|---|---|---|---|
| 3,362,793 | 1/1968 | Massoubre...................... | 259/102 X |
| 901,465 | 10/1908 | Pancoast........................... | 159/102 |
| 2,808,239 | 10/1957 | Reiffen .............................. | 259/102 |
| 1,444,910 | 2/1923 | Goetz................................. | 259/102 |
| 3,443,798 | 5/1969 | Overcashier et al............... | 259/102 |
| 3,533,604 | 10/1970 | Sabelis............................... | 259/102 |

FOREIGN PATENTS OR APPLICATIONS
| | | |
|---|---|---|
| 30,318 | 10/1965 | Japan |
| 1,026,282 | 3/1958 | Germany |
| 1,240,822 | 11/1967 | Germany |
| 815,133 | 6/1959 | Great Britain |

Primary Examiner—Geo. V. Larkin
Attorney—Cushman, Darby and Cushman

[57] ABSTRACT

Methods and apparatus are described for discouraging the formation of unwanted lumps which tend to form when preparing mixes of certain components, especially of fibres and a slurry. A mixing agitator, which is moved relative to the mix, is arranged to have a further motion such as by being free to rotate, or by being rotated, in response to conditions within the mix.

5 Claims, 6 Drawing Figures

PREPARATION OF MIXES

The present invention relates to the preparation of mixes and in particular to the preparation of fibrous mixes by which is meant mixes whose constituents comprise fibres and a slurry, e.g. glass fibres with a powder of the basic material or materials, cement or plaster or the like with or without additives, and water, or any other suitable liquid, e.g. an aqueous solution. The term 'mix' as used herein means an aggregation of the constituent materials and it is not intended to imply that this aggregation has necessarily been treated, e.g. in an effort to provide a homogeneous mixture of these materials.

Many different designs of mixers are at present available for general mixing purposes but those investigated have been found to be something less than satisfactory when used for preparing a 'fibrous mix' as above defined. In such cases unacceptably large lumps are invariably found to form in the mix unless special precautions are taken e.g. by adding the total fibre content to the slurry in small amounts so that at any instant only a small quantity of unmixed fibre is present in the mix. Once formed, however, these lumps will not disappear even after prolonged mixing. It seems that the lumps can be divided roughly into two different classes at least in the cases of a glass-fibre cement-slurry mix or a glass-fibre plaster-slurry mix although it may not always be possible in practice to say into which of these two classes a particular lump falls. However in general terms, lumps of the first class consist essentially of wads of glass-fibre. These wads are thought to be the result of insufficient breakdown of the fibre put into the mix and possibly arising from a tendency of the glass-fibers to agglomerate or even to align one with the other. The second class of lump is essentially a pellet of semi-dry powder, i.e. the cement or plaster, usually containing some wet fibres which have not associated with the slurry. Typically the pellets in this case might be about half an inch in size. Whereas wads or pellets of much smaller size could possibly be tolerated, these larger lumps can cause defects in artefacts made from the mix.

The same problem is expected to arise whether the basic powder constituent of the mix concerned is cement, plaster and/or some other material, e.g. sand, mortar, etc, and whether the fibres are glass fibres or for example steel wires, or fibres of some other material, such as carbon or asbestos for instance.

The present invention provides, according to one aspect, a method of preparing a mix, particularly a fibrous mix, including the steps of agitating the mix by movement through the mix of at least one agitator and arranging for further motion of said agitator, that is motion additional to said movement, to be effected in response to conditions within the mix, thereby at least to discourage, and possibly prevent, the formation of lumps in the mix. The relative movement of the agitator through the mix may be brought about by movement of the agitator itself or by movement of the mix, as by movement of a container for the mix. Said motion is conveniently effected as a rotational motion about an axis passing through the agitator and inclined substantially, e.g. at 90°, to the instantaneous direction of movement of said axis through the mix. Preferably the dimensions of the agitator for preparing a fibrous mix are large relative to the length or lengths of the fibres so as to prevent or discourage any of said fibres from becoming wrapped around said agitator during operation. It may be advantageous to arrange for means to be provided for adjustment of the said movement of the agitator.

According to another aspect of the invention there is provided apparatus for preparing a mix, particularly a fibrous mix, the apparatus comprising at least one agitator for movement through the mix and driving means for causing said movement, the agitator being mounted to enable further motion of the agitator, that is motion additional to said movement, to be effected in response to conditions within the mix, thereby to prevent or discourage the formation of lumps in the mix. Said agitator is preferably so mounted as to have some rotational freedom about an axis passing through the agitator and inclined, e.g. at 90°, to the intended direction of movement of said axis through the mix. Means may be provided in the form of a positive drive to cause the further motion of the agitator referred to.

In a preferred embodiment of the invention in accordance with the second aspect above described, there is provided an apparatus in which the or each is mounted to allow continuous rotation about its axis. The agitator or agitators may for example be so mounted on a support element itself rotatable about an axis possibly through it but which is non-coincident with the axis of rotation of the agitator itself. In one such apparatus in accordance with the invention, this support element is carried by a base unit rotatable about an axis possibly passing through itself but which is non-coincident with the axis of rotation of the support element. The apparatus may be designed for batch use in which case it is conveniently mounted so as in operation to project into a container for the mix with the support element mounted eccentrically of the container. In this way, the agitator carries out, what might be called, an orbital motion around the inside of the container in operation of the apparatus, and it can be arranged that, at its nearest approach to the container wall, in operation, the gap between the agitator and the wall is smaller than the size of lump to be discouraged from forming. If desired, in such a case, the container may be circular in horizontal section and the axis of rotation of the base unit may be arranged to coincide with the principal axis of symmetry of the container. Conveniently one, two or all of axes of rotation of the agitator, the support element and the base unit is/are perpendicular to the overall direction of said movement of the agitator through the mix in operation of the apparatus. Arrangements may be made for adjustment of the spacing of the axis of rotation of the agitator from the axis of rotation of the support element.

It is envisaged that the invention at least in its broadest aspects, may also be suitable for treatment of a continuous flow of a mix undergoing preparation and for that purpose the agitator may be arranged to be rotated bodily so as successively to enter and leave the mix in a general direction at an angle substantially less than a right angle to the general direction of flow so as to encourage flow and at the same time to cause mixing.

The invention also extends to a substantially lump-free mix produced by the apparatus or method referred to and to articles made with such a mix.

Figure 2:
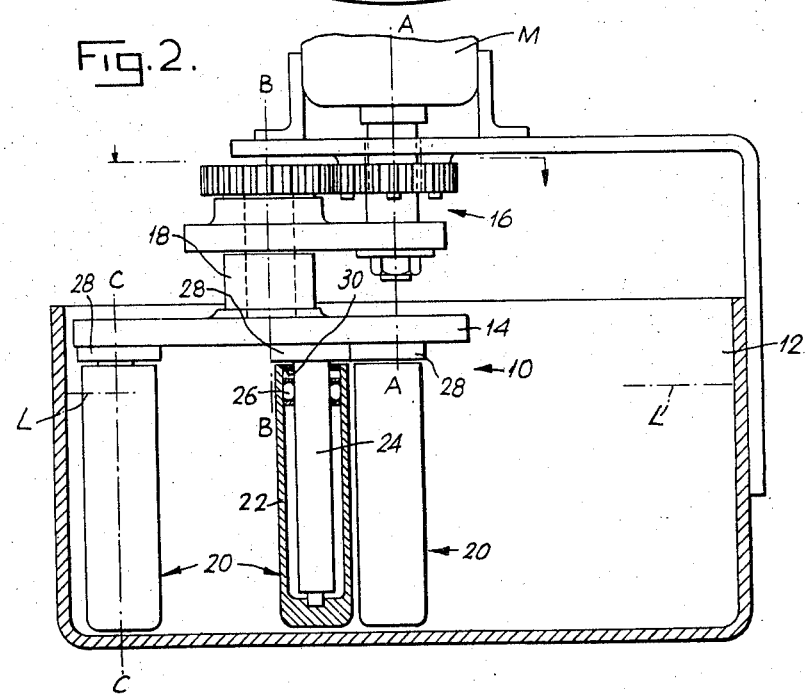
Figure 3:
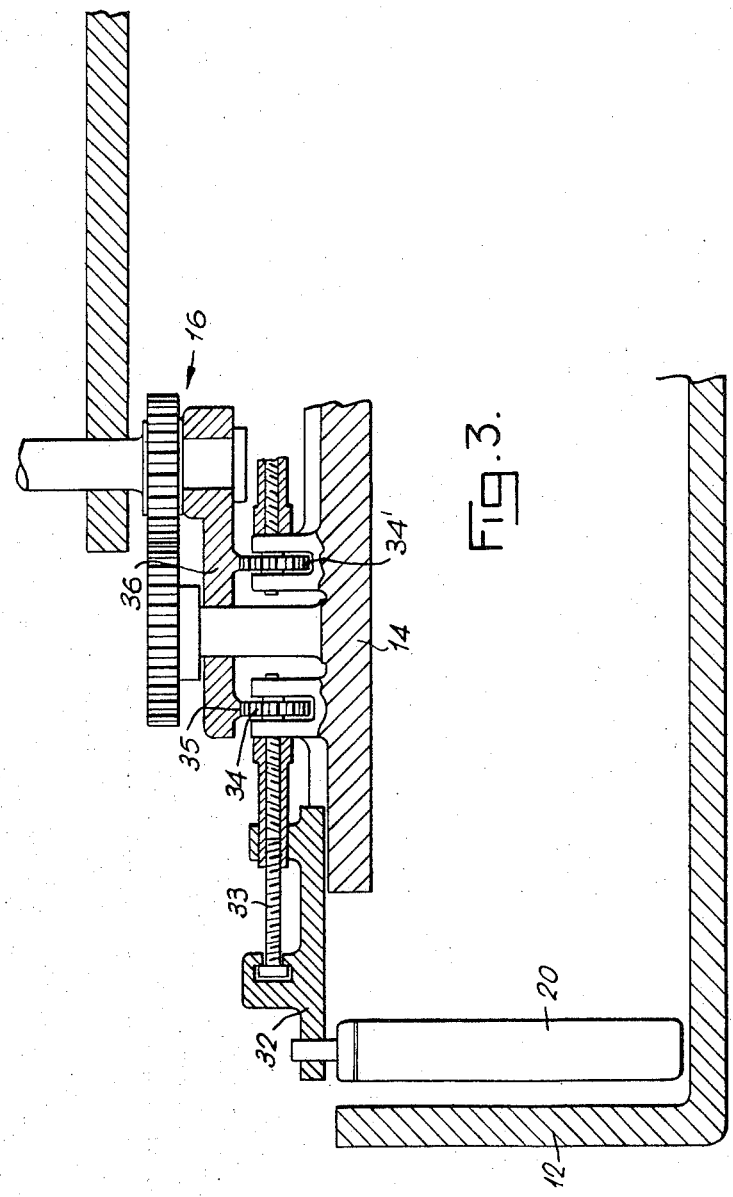
Figure 4:
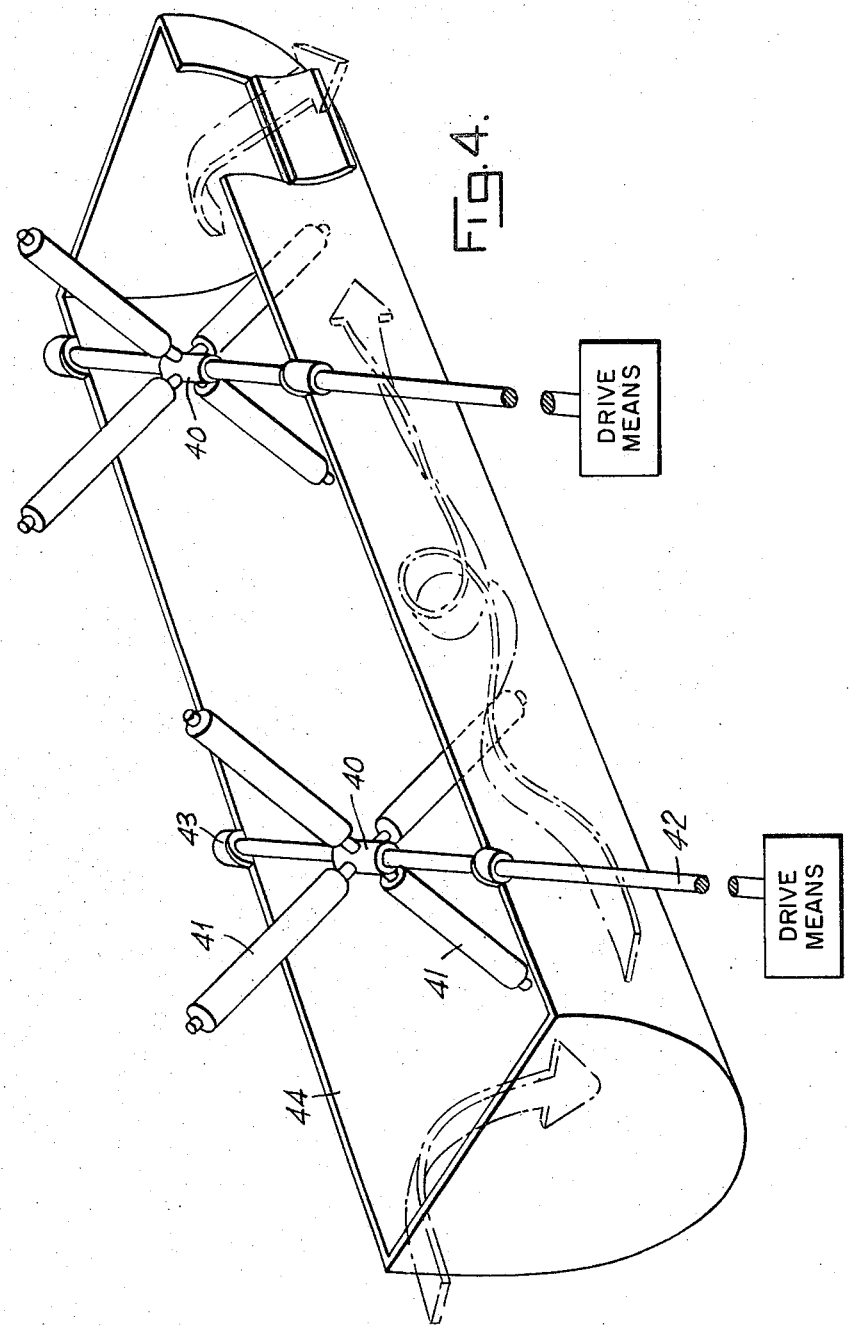
Figure 5:
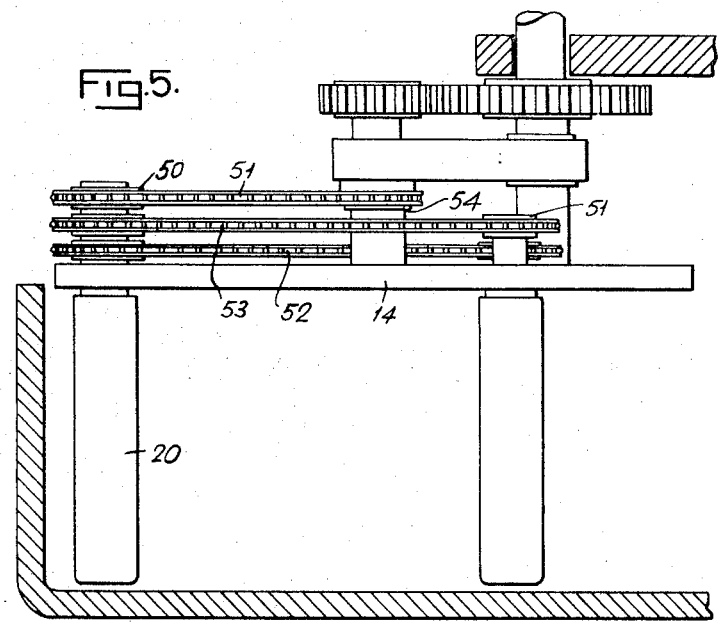
Figure 6:
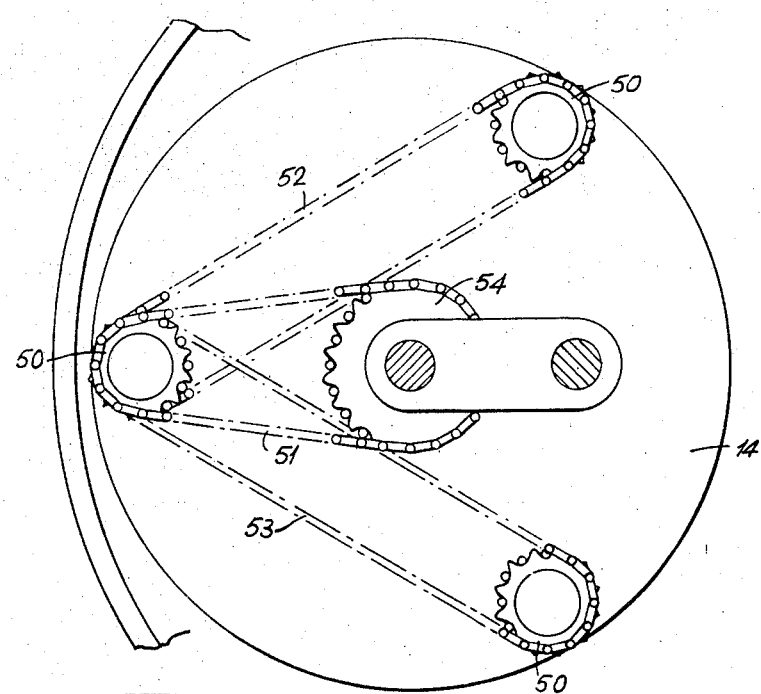

In order that the invention may be more fully understood, embodiments thereof will now be described, by way of example, with reference to the accompanying largely diagrammatic drawings of which:

FIG. 1 represents a plan view of mixing apparatus in accordance with the present invention and showing the relative disposition of the various parts of the apparatus at one particular instant; and FIG. 2 represents a side view, partly in section, of the apparatus of FIG. 1, FIG. 3 represents a partial side elevation of a modification of the apparatus illustrated in FIGS. 1 and 2, FIG. 4 represents, in perspective, part of mixing apparatus suitable for continuous flow, and FIG. 5 and 6 represent, respectively, a partial side elevation and a plan view of a further modification of the apparatus illustrated in FIGS. 1 and 2.

Thus referring to FIGS. 1 and 2, a mixer assembly 10 in accordance with the present invention projects into a stationary bowl 12 for containing the mix.

The assembly 10 comprises a support element 14 pivotally mounted on and spaced from a base unit 16 by a boss member 18 which may for example be an adaptor adapting the spindle of a standard vertical axis machine for the purposes of the present invention. It is envisaged that horizontal axis paddle mixers could be similarly adapted. The unit 16 is arranged for rotation about a vertical axis A—A coinciding with the principal axis of symmetry of the bowl 12 which is round in plan view. The element 14 is rotatable about axis B—B and carries three agitator or stirring members 20 each rotatable about its principal axis of symmetry C—C. In more detail each member 20 comprises a sleeve 22 surrounding an axle 24 and spaced therefrom at the upper end of the sleeve by a ball or roller bearing 26. The top of axle 24 finishes in a flange 28 which is rigidly secured to the element 14 whilst the bottom of axle 24 engages bearing surfaces in the lower (closed) end of the sleeve. A sealing ring 30 between the sleeve and the axle prevents the ingress of material into the annular space between these two parts of the apparatus.

The dimensions of the agitator member should be large relative to the length of the fibres in the mix. Thus with typical glass fibre lengths of a half to 1½inches, the diameter of the agitator members, if these were of the illustrated form, would be preferably at least one and a half to twice this value and in any case preferably not such as to give a semi-periphery smaller than said fibre length. Thus the agitator members for example, having diameters of 40 mm. are intended for use with glass fibres up to 15 mm. in length. The agitator members are of course spaced from the floor and the walls of the bowl 12 but preferably only by small amounts at their points of nearest approach. When the agitator members are 40 mm. and where the length of the members 20 is 12 inches the clearances may be 0.2 inches.

In a variant of the apparatus illustrated in FIGS. 1 and 2, means are provided whereby these clearances may be varied from a first value, say one-eighth in. to 1 in. prior to completion. Such a variant is illustrated in FIG. 3 where the agitator members 20 are each mounted on a separate slide member 32 which is adapted to be moved radially on the support element 14 by means of a captive screw 33 which is operated by a spur wheel 34. The spur wheel 34 engages a circular rack of teeth 35 formed concentric with the axis of the element 14 on the under-surface of the part 36 of the base unit 16. Although shown in the position diametrically opposite the spur wheel 34 for clarity, the spur wheel 34' for operating the mounts for each other agitator members 20 also engages the same rack 35. It is arranged that the threads or screws 33 are such that, at commencement of a mixing operation, the agitator members 20 commence at a distance from the wall of the bowl 12 and, as the support element 14 rotates, to be pushed out by the screw thread until the agitator members approach the walls to a minimum extent. This minimum extent will, of course, be governed by the dimension necessary to avoid the lumps referred to. Thus the threaded portions of screws 33 may be arranged to run out of the boss on the slide 32 at the final positioning of the agitator members. Alternatively arrangements may be made to produce the same effect by means of slipping clutches on the spur wheels 34, in which case the screws 33 would run up against a stop. It can be arranged, therefore, that the final positioning of the agitator members 20 may be reached at a suitable time after commencement of the mixing operation.

In addition to the parts shown in the FIGS. 1 and 2, the apparatus includes drive means rotationally coupling the unit 16 with the element 14 so that rotation of the former about axis A—A causes rotation of the latter about axis B—B. The drive means may, for example, comprise an appropriate system of intermeshing gear wheels contained in the unit 16, e.g. a planet wheel fixed relative to element 14 and meshing with a non-rotating sun wheel mounted concentrically with axis A—A.

In operation of the illustrated apparatus in accordance with the method of the present invention, the apparatus is connected up with a motor, depicted diagrammatically at M, and the motor is started to rotate unit 16 about axis A—A and hence element 14 about the, orbiting, axis B—B. The constituents of the mix are then introduced into container 12, up to level L—L say.

With the mix constituents in the bowl 12, the angular velocity of unit 16 about axis A—A would typically be 50 revolutions per minute whereas that of the element 14 about axis B—B would typically be 150 revolutions per minute. At these speeds a 28 lbs. plaster mix having 50 percent of water content and a 4 percent glass fibre content could be satisfactorily mixed in about 30 seconds with no detectable pellets or wads present.

The exact rotational motion of the members 20 about their axes C—C is not at present known. One possibility is that the members are continuously rotating, though probably not with a uniform angular velocity, in a single sense about these axes but on the other hand it may be that they are actually exercising a fairly regular oscillatory rotational motion or indeed it may even be that their motion about axes C—C is entirely irregular. Whatever be the exact motion of the agitator means, their effectiveness in preparing a mix is not in question. It is suspected that the surprising success of the apparatus arises from the fact that the members 20, being capable of free rotation about their axes C—C, possess a freedom of rotational motion which allows fibres contacting a member to be immediately released to the mix as the member rotates or momentarily modifies its existing rotation under their influence. It is though that this process must be encouraged in the illustrated apparatus by having the semi-periphery of the stirrer members greater than the maximum fibre length with which the apparatus is intended to be used.

It is also envisaged that the invention may prove useful in the treatment of fibrous mixes in a continuous flow technique. One approach that could be especially suited for such purposes is illustrated in FIG. 4. In this arrangement mixing members 40 are arranged in lines across the flow of mix in a trough 44. The flow of mix is illustrated by means of developed arrows and it is thought clearly enough as not to require further description. Each agitator member support unit 40 comprises four rotary agitators 41 aranged with their axes at right angles to a shaft 42; the shaft 42 is arranged at an inclination to the direction of flow, and bearings 43 are provided on each side of the trough 44. In operation overall flow motion of the mix may be such as to cause rotation of the rotary agitators 41 but some form of blading or the like may be necessary or desirable to cause such rotation of the agitators. Obviously in such a case the agitators would still possess a degree of rotational freedom in that they could accelerate or decelerate their motions if necessary to shed fibres which were tending to build up on them.

The importance of the surface of the agitator members has not yet been ascertained. Agitator members with polished metal surfaces have been successfully used but it is not yet certain whether low friction surfaces, e.g. using PTFE, or high friction surfaces would improve the performance of the apparatus. On the one hand it is feasible that the fibres will more readily slip from a lower friction surface than that at present used but on the other hand these fibres would be less likely to cause the freeing motion of the member thought to be necessary to free fibres caught up on the members.

Although in the above described embodiments it is the drag forces imposed on the agitators by the mix itself which causes their fibre freeing motion, a further embodiment of the invention is also envisaged in which the agitators are driven in their fibre-freeing motion, possibly using the Magnus effect, by a different source located externally of the mix and controlled by sensor means projecting in to the container and in operation sensing the physical characteristics of the mix.

Such a further embodiment is illustrated in FIGS. 5 and 6 wherein rotary agitators 20 are indicated as being rotated positively by means of sprocket wheels 50 driven by chains 51, 52 and 53 from a sprocket wheel 54 which rotates with the supp'rt element 14. By suitable choice of relative diameters of the sprockets 50 and 54, the rate of rotation of the agitator members 20 may be suitably selected. Slipping clutch or like means in all or some of the sprocket drives are provided to sense the characteristics of the mix. Alternatively the drive to the main sprocket 54 may be under the control of a sensor (not illustrated) which senses characteristics of the mix. Suitable forms of such sensor will be evident to those skilled in the art.

I claim:

1. An apparatus for agitating a slurry-based fibrous mass, the apparatus comprising:
    a container for said slurry-based fibrous mass;
    an agitator member support unit rotatable about a first axis passing through said support unit;
    a first drive means for rotating said agitator element support unit about said first axis;
    a base unit carrying said support unit and rotatable about a second axis offset from said first axis and within said container;
    a second drive means for rotating said base unit about said second axis;
    at least one externally cylindrical agitator member supported from said agitator support unit through a third axis passing through said agitator member;
    said agitator member disposed from said agitator support unit into said container while spaced from the floor and walls of said container;
    said agitator member freely rotatably mounted to said agitator support unit by bearing means, such that in operation, when said first and second drive means respectively rotate said agitator support unit about said first and second axes, said agitator member, devoid of drive means, is unrestrained from rotation about said third axis.

2. The agitating apparatus as claimed in claim 1 wherein said container is open at the top thereof and said agitator member support unit is mounted over said open container.

3. An apparatus for agitating a mix, the apparatus comprising:
    a container for said mix;
    an agitator member support unit rotatable about a first axis passing through said support unit;
    a first drive means for rotating said agitator element support unit about said first axis;
    a second drive means for rotating said agitator member support unit about said second axis;
    a base unit carrying said support unit and rotatable about a second axis offset from said first axis and within said container;
    at least one externally cylindrical agitator member supported from said agitator support unit through a third axis passing through said agitator member;
    said agitator member disposed from said agitator support unit into said container while spaced from the floor and walls of said container;
    said agitator member freely rotatably mounted to said agitator support unit, such that in operation, when said first and second drive means respectively rotate said agitator support unit about said first and second axes, said agitator member, devoid of drive means, is unrestrained from rotation about said third axis.

4. An apparatus for agitating a slurry-based fibrous mass, the apparatus comprising:
    a trough shaped container for said slurry-based fibrous mass providing substantially continuous flow of said mass being agitated;
    an agitator member support unit rotatable about a first axis passing through said support unit disposed to said container at an angle oblique to the overall direction of flow of said mass in said container;
    at least one externally cylindrical agitator member supported from said agitator support unit through a second axis passing through said agitator member and substantially perpendicular to said first axis;
    said agitator member being disposed from said agitator support unit into said container while spaced from the floor and walls of said container;
    a drive means for rotating said agitator element support unit about said first axis adatped to rotate said agitator element support unit so the agitator member successively enters and leaves the mass being agitated in a general direction at an angle substantially less than a right angle to the overall direction of flow so as to concurrently agitate said mass and to encourage the flow thereof said trough-shaped container;

said agitator member freely rotatably mounted to said agitator support unit by bearing means, such that in operation, when the drive means rotates said agitator support unit about said first axis, said agitator member, devoid of drive means, is unrestrained from rotation about said second axis.

5. An apparatus for agitating a mix, the apparatus comprising:

a trough-shaped container for said mix providing substantially continuous flow of said mix being agitated;

an agitator member support unit rotatable about a first axis passing through said support unit disposed to said container at an angle oblique to the overall direction of flow of said mix in said container;

at least one externally cylindrical agitator member supported from said agitator support unit through a second axis passing through said agitator member and substantially perpendicular to said first axis;

said agitator member being disposed from said agitator support unit into said container while spaced from the floor and walls of said container;

a drive means for rotating said agitator element support unit about said first axis adapted to rotate said agitator element support unit so the agitator member successively enters and leaves the mix being agitated in a general direction at an angle substantially less than a right angle to the overall direction of flow so as to concurrently agitate and to encourage the flow of said mix through said trough-shaped container;

said agitator member being freely rotatably mounted to said agitator support unit, such that in operation, when said drive means rotates said agitator support unit about said first axis, said agitator member, devoid of drive means, is unrestrained from rotation about said second axis.

* * * * *